(12) United States Patent
Broadbent et al.

(10) Patent No.: US 7,454,686 B2
(45) Date of Patent: Nov. 18, 2008

(54) APPARATUS AND METHOD TO CHECK DATA INTEGRITY WHEN HANDLING DATA

(75) Inventors: Steven T. Broadbent, Tucson, AZ (US); Michael H. Hartung, Tucson, AZ (US); Carl E. Jones, Tucson, AZ (US); Karl A. Nielsen, Tucson, AZ (US); Jeremy M. Pinson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 10/995,873

(22) Filed: Nov. 23, 2004

(65) Prior Publication Data

US 2006/0109792 A1    May 25, 2006

(51) Int. Cl.
*G11C 29/00* (2006.01)

(52) U.S. Cl. ..................... 714/763; 714/768

(58) Field of Classification Search .................. 714/7, 714/42, 54, 718, 763, 768, 770, 819, 6
See application file for complete search history.

(56) References Cited

U.S. PATENT DOCUMENTS

| | | | |
|---|---|---|---|
| 4,692,893 A | 9/1987 | Casper | |
| 5,233,618 A | 8/1993 | Glider et al. | |
| 5,469,453 A | 11/1995 | Glider et al. | |
| 5,504,858 A | 4/1996 | Ellis et al. | |
| 5,751,936 A * | 5/1998 | Larson et al. | 714/7 |
| 5,878,280 A | 3/1999 | Lucht | |
| 5,913,927 A | 6/1999 | Nagaraj et al. | |
| 5,960,169 A * | 9/1999 | Styczinski | 714/6 |
| 6,018,778 A | 1/2000 | Stolowitz | |
| 6,237,052 B1 | 5/2001 | Stolowitz | |
| 6,553,511 B1 | 4/2003 | DeKoning et al. | |

* cited by examiner

*Primary Examiner*—Jacques Louis-Jacques
*Assistant Examiner*—Fritz Alphonse
(74) *Attorney, Agent, or Firm*—Dale F. Regelman; Quarles & Brady LLP

(57) ABSTRACT

An apparatus and method to check integrity when handling data. The method provides a storage array which includes a plurality of sectors. The method defines (N) data state identifiers and (N) parity state identifiers. The method receives a command to handle data, where that command designates a target sector. The method determines the data state identifier assigned to the target sector, determines the parity state identifier assigned to the target sector, and compares the data state identifier and the parity state identifier. If the method determines that the data state identifier and the parity state identifier are the same, the method performs the command to handle data. Alternatively, if the method determines that the data state identifier and the parity state identifier differ, the method generates an error message.

10 Claims, 8 Drawing Sheets

FIG. 6

610 — READ (MEMBER 0, LBA=0)

620 — READ (PARITY, LBA=0)

630 — VERIFY MEMBER0 CHECK BIT = MEMBER0 CHECK BIT FROM PARITY DRIVE COPY

IF CHECK BITS ARE OUT OF SYNC, A DROPPED WRITE HAS BEEN DETECTED.

640 — XOR REMOVE MEMBER0 DATA FROM PARITY

650 — ADVANCE MEMBER0 CHECK BIT TO NEXT STATE.

660 — CALCULATE NEW PARITY

670 — WRITE (NEW DATA, MEMBER0, LBA=0)

680 — WRITE (NEW PARITY, PARITY DRIVE, LBA=0)

600

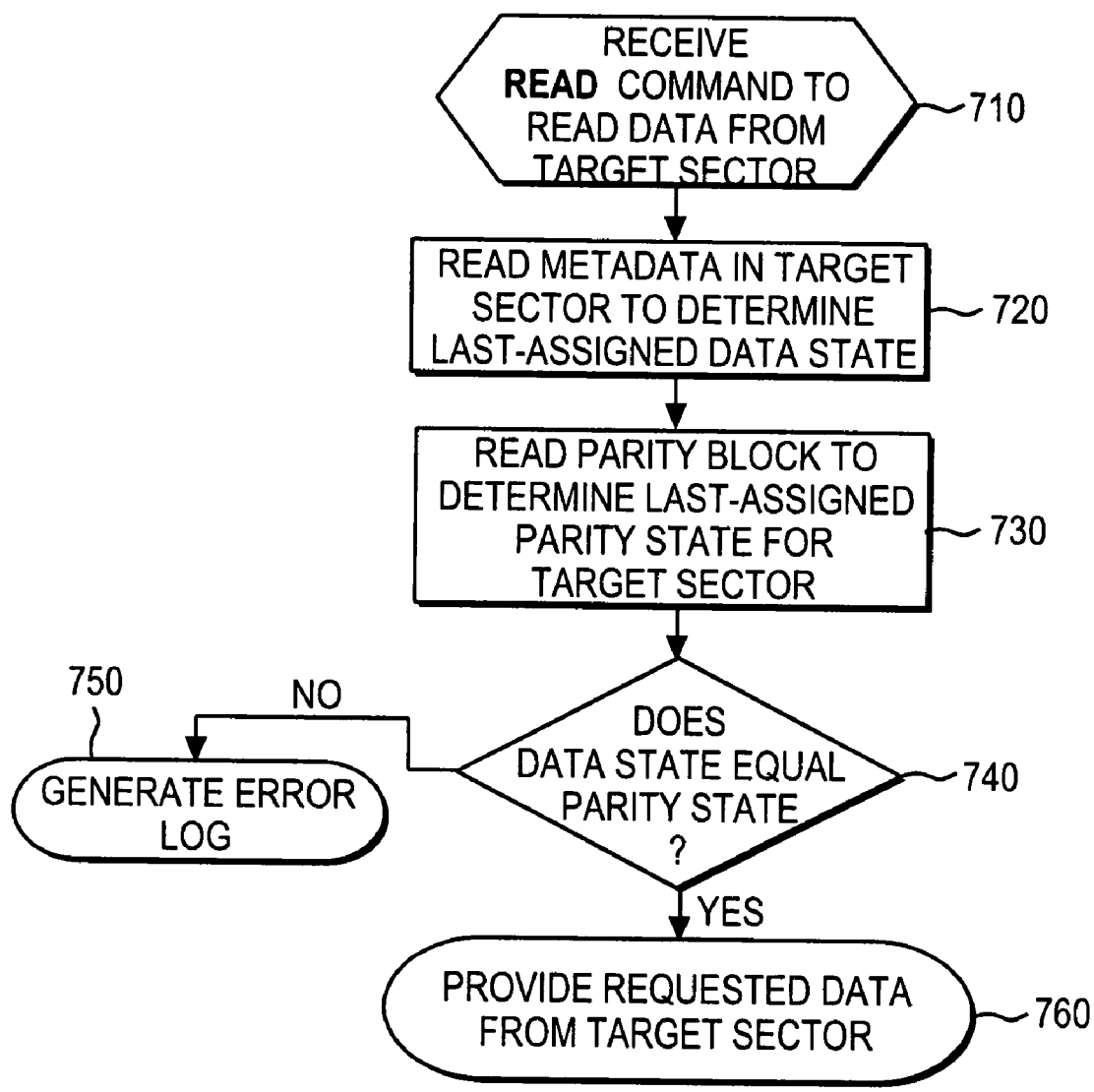

APPARATUS AND METHOD TO CHECK DATA INTEGRITY WHEN HANDLING DATA

FIELD OF THE INVENTION

The invention relates to an apparatus and method to check data integrity when handling data. More specifically, the invention relates to an apparatus and method to check data states and parity states when handling data. In certain embodiments, the invention relates to an apparatus and method to check data states and parity states when writing data. In certain embodiments, the invention relates to an apparatus and method to check data states and parity states when reading data.

BACKGROUND OF THE INVENTION

Information storage and retrieval systems are used to store information provided by one or more host computer systems. Such information storage and retrieval systems receive requests to write information to one or more information storage devices, and requests to read information from those one or more information storage devices. The system is continuously moving information to and from storage devices.

Data storage devices, such as hard disk drives, can "drop write," i.e. fail to write data to a designated sector of the storage medium, and/or perform off-track writes to that designated sector. A subsequent read of this sector would receive old, i.e. "stale," data instead of the data last written. In a RAID-5 encoded array, if a subsequent write to the parity stripe that causes the invalidly written sector to be read in calculating the new parity, the parity will become corrupt with the previous data because the read used to update the parity will get stale data instead of the data that was used when creating the parity.

In order to identify such dropped writes/off-track writes, the prior art teaches reading back data after every write. Such a read back verifies that the data is written correctly. Such read backs necessarily require, however, an additional read operation for every write operation. The prior art also teaches regularly checking the parity of the entire storage array. This approach is cumbersome and requires an inordinate amount of time. Moreover, while such a parity check is in progress, parity corruption can occur at a different part of the storage medium.

What is needed is a method to identify dropped writes and/or off-track writes without reading back every write, and without checking the parity of the entire storage array. Applicants' method identifies dropped writes and off-track writes by checking the data state and the parity state of a sector when handling data.

SUMMARY OF THE INVENTION

Applicants' invention includes an apparatus and method to check data states and parity states when handling data. The method provides an information storage array which includes an information storage array comprising a plurality of sectors. The method defines (N) data state identifiers and (N) parity state identifiers. The method receives a command to handle data, where that command designates a target sector.

The method determines the data state identifier assigned to the target sector, determines the parity state identifier assigned to the target sector, and compares the data state identifier and the parity state identifier.

If the method determines that the data state identifier and the parity state identifier are the same, the method performs the command to handle data. Alternatively, if the method determines that the data state identifier and the parity state identifier differ, the method generates an error message.

BRIEF DESCRIPTION OF THE DRAWINGS

The invention will be better understood from a reading of the following detailed description taken in conjunction with the drawings in which like reference designators are used to designate like elements, and in which:

FIG. 6 recites an algorithm encoding the method of FIG. 5; and

FIG. 7 is a flow chart summarizing the steps of Applicants' method to read data.

DETAILED DESCRIPTION OF THE PREFERRED EMBODIMENTS

Referring to the illustrations, like numerals correspond to like parts depicted in the Figures. The invention will be described as embodied in a data storage and retrieval system comprising two or more clusters, where each of those clusters includes one or more processors, one or more data caches, and one or more non-volatile storage devices. The following description of Applicant's method to assign data states and parity states when writing data is not meant, however, to limit Applicant's invention to data processing systems in general, or to data processing system which include a plurality of clusters, as the invention herein can be applied to writing data to a plurality of storage media in general.

Figure 1:
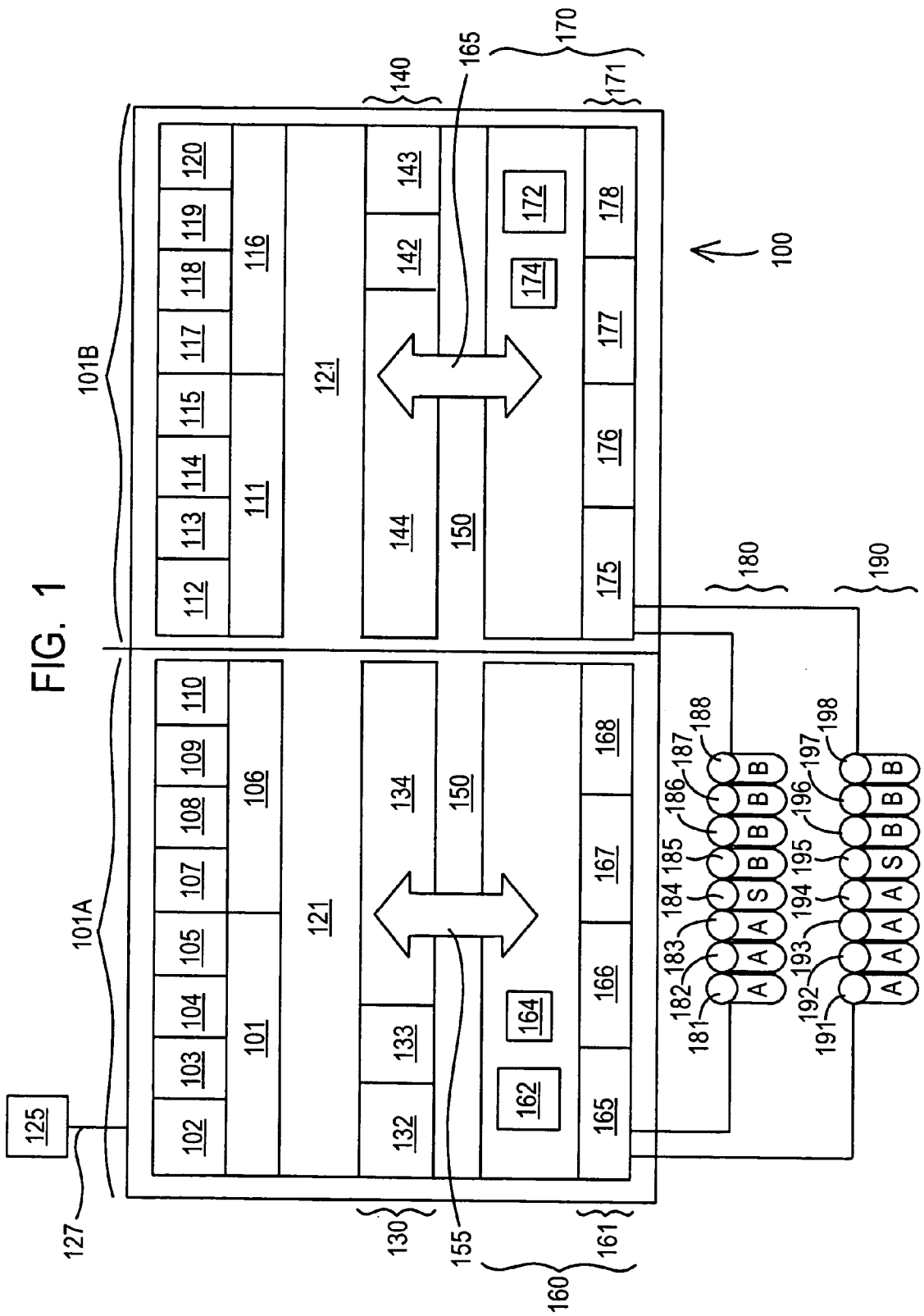
FIG. 1 is a block diagram of one embodiment of Applicants' information storage and retrieval system.

In the illustrated embodiment of FIG. 1, Applicants' information storage and retrieval system 100 includes a first cluster 101A and a second cluster 101B. Each cluster includes a processor portion 130/140 and an input/output portion 160/170, respectively. Internal PCI buses in each cluster are connected via a Remote I/O bridge 155/165 between the processor portions 130/140 and device I/O portions 160/170, respectively.

In the illustrated embodiment of FIG. 1, system 100 is capable of communicating with host computer 125 via communication link 127. In certain embodiments, communication link 127 is selected from a serial interconnection, such as RS-232 or RS-422, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Information storage and retrieval system 100 further includes a plurality of host adapters 102-105, 107-110, 112-115, and 117-120, disposed in four host bays 101, 106, 111, and 116. Each host adapter may comprise one or more Fibre Channel ports, one or more FICON ports, one or more ESCON ports, or one or more SCSI ports. Each host adapter is connected to both clusters through one or more Common Platform Interconnect bus 121 such that each cluster can handle I/O from any host adapter.

Processor portion 130 includes processor 132 and cache 134. In certain embodiments, processor portion 130 further include memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further include memory 143. In certain embodiments, memory device 143 comprises random access memory. In certain embodiments, memory device 143 comprises non-volatile memory.

I/O portion 160 includes non-volatile storage ("NVS") 162 and NVS batteries 164. I/O portion 170 includes NVS 172 and NVS batteries 174.

I/O portion 160 further comprises a plurality of device adapters, such as device adapters 165, 166, 167, and 168, and information storage media organized into two arrays, namely array "A" and array "B". The illustrated embodiment of FIG. 1 shows two information storage arrays. In other embodiments, Applicants' information storage and retrieval system includes more than two information storage arrays. Each such information storage array appears to a host computer as one or more logical devices.

In certain embodiments, Applicants' information storage media comprise magnetic media, such as for example hard disks disposed in individual hard disk drive units. In certain embodiments, Applicants' information storage media comprise optical media, such as for example CDs, DVDs, and the like. In certain embodiments, Applicants' information storage media comprise electronic storage media, such as PROMs, EPROMs, EEPROMs, Flash PROMs, compactflash, smartmedia, and the like.

In certain embodiments, arrays "A" and "B" utilize a RAID protocol. In certain embodiments, arrays "A" and "B" comprise what is sometimes called a JBOD array, i.e. "Just a Bunch Of Disks" where the array is not configured according to RAID. As those skilled in the art will appreciate, a RAID (Redundant Array of Independent Disks) rank comprises independent information storage media configured in an array to obtain performance, capacity and reliability that exceeds that of a single large storage medium.

In the certain embodiments, array "A" includes hard disk drives 181, 182, 183, 191, 192, 193, and 194, and array "B" includes hard disk drives 185, 186, 187, 188, 196, 197, and 198.

Applicants' information storage and retrieval system, such as system 100 (FIG. 1), receives new data from one or more host computers, such as for example host computer 125 and writes that new data to one or more information storage arrays, such as for example information storage array 180 (FIG. 1). The illustrated embodiment of FIG. 1 shows system 100 interconnected with one host computer. In other embodiments, Applicants' information storage and retrieval system is capable of communicating with a plurality of host computers.

Applicants' information storage and retrieval system receives new data, and writes that new data to one or more designated sectors on one or more information storage media. A number of failure modes exist wherein that new data may not be encoded to the storage media. For example, data storage devices sometimes fail to properly write data to the information storage medium. In addition, data storage devices sometimes perform offtrack writes to a sector. Regardless of the failure mode, a subsequent attempt to read the new data instead returns old data. Using a RAID 5 protocol, if a single sector write is unsuccessful a subsequent write to the parity stripe that causes the invalidly written sector to be read in calculating the new parity, the parity will become corrupt with the previous data because the read used to update the parity will get stale data instead of the data that was used when creating the parity.

In certain embodiments, Applicants' method writes information to a designated sector using a RAID 5 protocol. A RAID (Redundant Array of Independent Disks) combines two protocols: parallelism and redundancy. A RAID uses multiple information storage media in parallel to provide much higher bandwidth than a single storage medium. A RAID can also perform multiple operations in parallel. Redundancy in the form of parity is used to maintain reliability. By storing parity, data can be fully recovered after a single storage device failure.

Using a RAID 5 protocol, data is striped across multiple storage media as blocks. With (R) storage media, a group of (R-1) data blocks is striped across (R-1) media. A parity block is computed by exclusive-oring ("XORing") these (R-1) blocks, and the parity block is stored on the remaining storage medium. Parity is distributed meaning that successive parity blocks are stored on different storage media to avoid the bottleneck of a dedicated parity medium. Each individual block is called a stripe unit, and a collection of (R-1) data blocks and a parity block is called a parity stripe.

For peak efficiency, a full parity stripe should be written at once. In this case, the data and the parity can be written out in parallel. If only part of the parity stripe is modified, parity must be recomputed from the data already on disk. The old data and parity must be read, and then the new data and the recomputed parity are written.

Figure 3A:
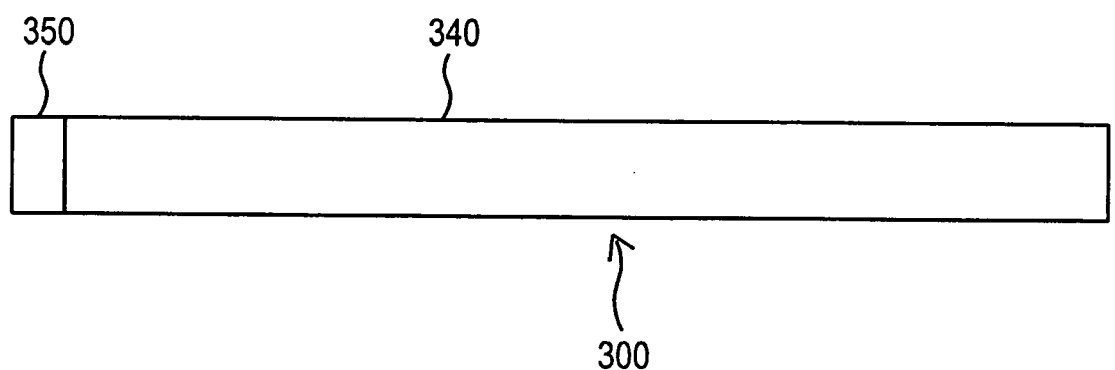
FIG. 3A is a block diagram showing a data sector comprising a data portion and a metadata portion.
Figure 3B:
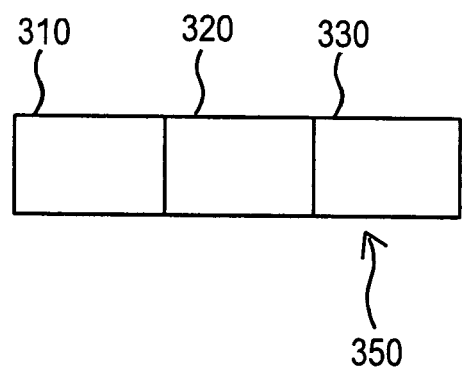
FIG. 3B is a block diagram of the metadata portion of FIG. 3A comprising a plurality of data state addresses.

Each information storage medium in Applicants' one or more storage arrays comprises a plurality of sectors, such as for example sector 300 (FIG. 3A), where each of those sectors includes an information portion 340 comprising about 512 bytes and a metadata portion 350 comprising about 12 bytes.

In a storage system comprising (R) storage media, Applicants' method maintains (R) State Addresses for data written to sector 300, where (R) is greater than or equal to 2. A Data State Identifier is maintained in one of those (R) State Addresses.

As a general matter, Applicants' method writes both the data and the corresponding Data State Identifier to the same sector. In the event sector 300 is written to (i)th storage medium, then Applicants' method utilizes the (i)th State Address to store the Data State Identifier for the data written to sector 300.

Figure 4A:
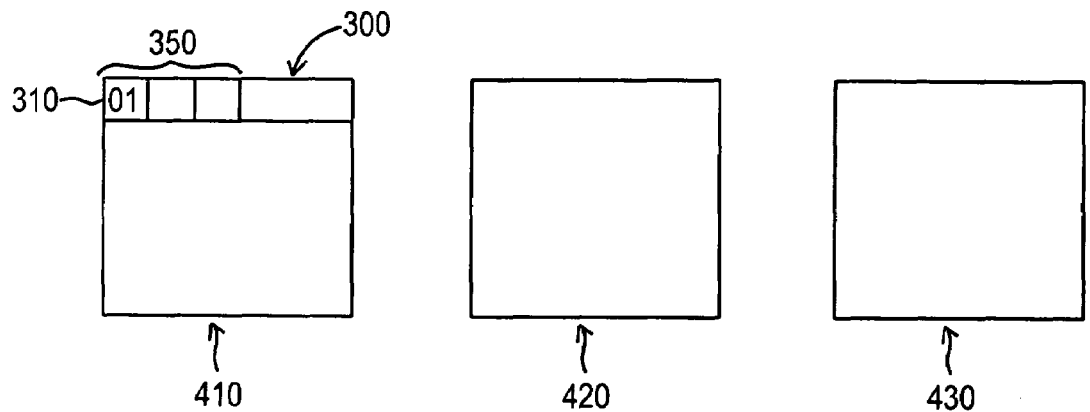
FIG. 4A is a block diagram showing a Data State Identifier maintained at a first State Address for information written to a first storage medium.

As an example and referring to FIG. 4A, in this illustrated embodiment Applicants' storage system includes 3 storage media, namely storage media 410, 420, and 430. In the illustrated embodiment of FIG. 4A, sector 300 is written to first storage medium 410, and therefore, Applicants' method maintains a Data State Identifier for the data of sector 300 using the first State Address, namely State Address 310. In this illustrated embodiment, that Data State Identifier is "01."

Figure 4B:
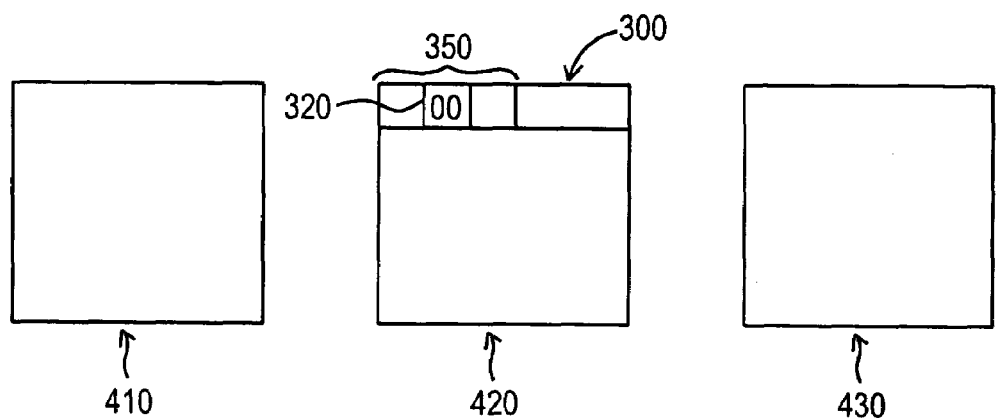
FIG. 4B is a block diagram showing a Data State Identifier maintained at a second State Address for information written to a second storage medium.

In the illustrated embodiment of FIG. 4B, sector 300 is written to second storage medium 420, and therefore, Applicants' method maintains a Data State Identifier for the data of sector 300 using the second State Address, namely State Address 320. In this illustrated embodiment, that Data State Identifier is "00."

Figure 4C:
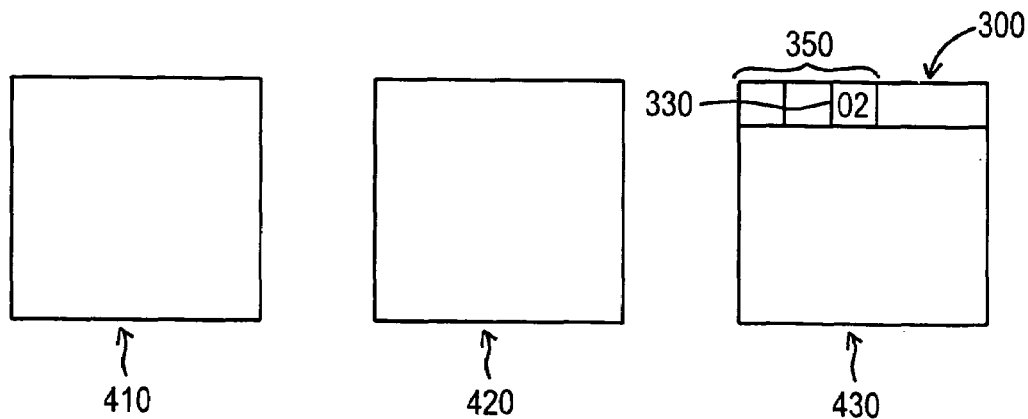
FIG. 4C is a block diagram showing a Data State Identifier maintained at a third State Address for information written to a third storage medium.

In the illustrated embodiment of FIG. 4C, sector 300 is written to third storage medium 430, and therefore, Applicants' method maintains a Data State Identifier for the data of sector 300 using the third State Address, namely State Address 330. In this illustrated embodiment, that Data State Identifier is "02."

As those skilled in the art will appreciate, an information storage medium may comprise many thousands, or more, of sectors. Using Applicants' method, the data state for any one of those sectors can be determined by examining the Data State Identifier written one of the State Addresses disposed in the metadata portion of that sector.

Figure 2:
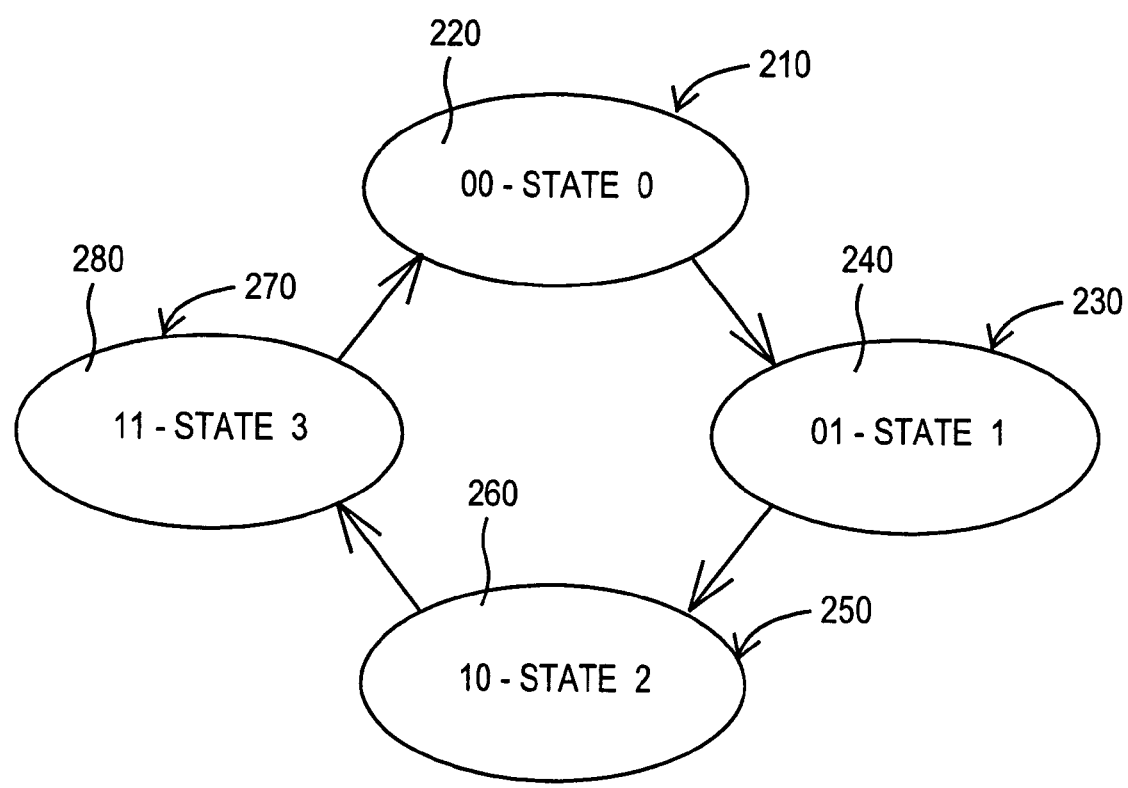
FIG. 2 is a block diagram showing four data states/parity states.

Referring to FIG. 2, in certain embodiments Applicants' method defines 4 different data states, namely State0, State1, State2, and State3. In the illustrated embodiment of FIG. 2, State0 is assigned identifier "00," State1 is assigned identifier "01", State2 is assigned identifier "10," and State3 is assigned identifier "11".

Applicants' method maintains a corresponding parity sector for each information sector. As a general matter, if Applicants' method writes information to the (m)th sector on the (i)th storage medium, then Applicants' method maintains a Data State Identifier for that information at the (i)th State Address portion of the (m)th sector on (i)th storage medium, and maintains a Parity State Identifier for the information at the (i)th State Address portion of the (m)th sector on the O)th storage medium, where (i) and (j) differ. As a further general matter, where a parity sector is written to the (m)th sector on the (j)th storage medium, then the (j)th State Address portion of that (m)th sector on the (j)th storage medium will not be used.

Figure 4D:
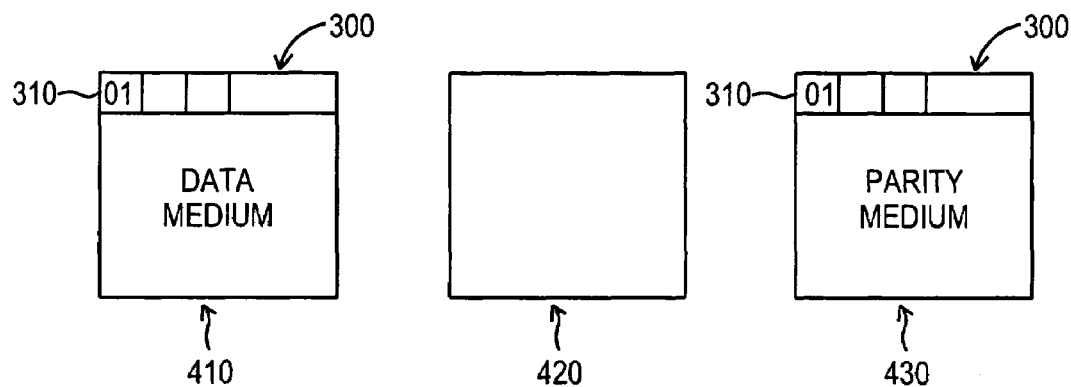
FIG. 4D is a block diagram showing a Data State Identifier maintained at a first State Address on the (m)th sector written to a first storage medium and a corresponding Parity State Identifier maintained at a first State Address on the (m)th sector written to a third storage medium.

For example in the illustrated embodiment of FIG. 4D, information has been written to sector 300, i.e. the "m(th)" sector, on the (i)th storage medium 410, where (i) is 1. This being the case, Applicants' method maintains a Data State Identifier at the (i)th State Address portion 310 of that (m)th sector of the (i)th storage medium. In the illustrated embodiment of FIG. 4D, that Data State Identifier is "01." Applicants' method maintains a corresponding (m)th parity sector on the (j)th storage medium. In the illustrated embodiment of FIG. 4D, (j) is 3, i.e. parity sector 300 is written to the third storage medium 430. Applicants' method further maintains a Parity State Identifier in the (i)th State Address portion, i.e. State Address 310 portion of parity sector 300 on the third storage medium. In the illustrated embodiment of FIG. 4D, that Parity State Identifier is "01." Thus in the illustrated embodiment of FIG. 4D, the Data State Identifier and the Parity State Identifier are the same for the information written to sector 300 on storage medium 410.

Figure 4E:
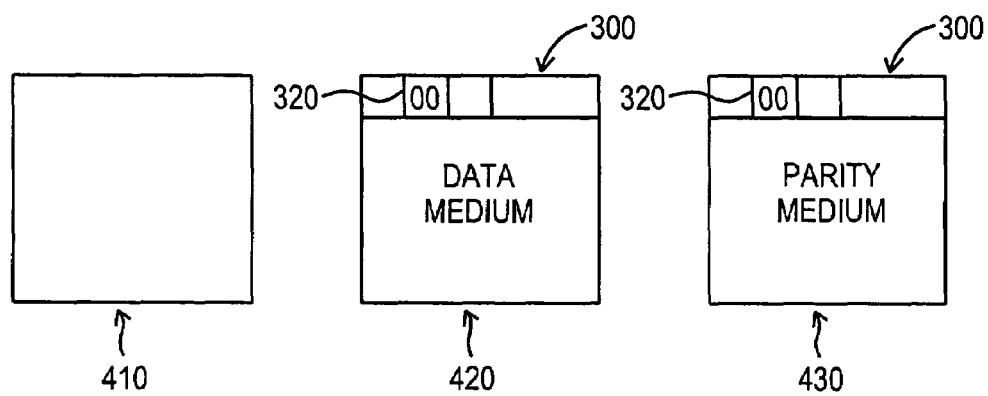
FIG. 4E is a block diagram showing a Data State Identifier maintained at a second State Address on the (m)th sector written to a second storage medium and a corresponding Parity State Identifier maintained at a second State Address on the (m)th sector written to a third storage medium.

In the illustrated embodiment of FIG. 4E, information has been written to sector 300, i.e. the "m(th)" sector, on the (i)th storage medium 420, where (i) is 2. This being the case, Applicants' method maintains a Data State Identifier at the (i)th State Address portion 320 of that (m)th sector of the (i)th storage medium. In the illustrated embodiment of FIG. 4E, that Data State Identifier is "00." Applicants' method maintains a corresponding (m)th parity sector on the O)th storage medium. In the illustrated embodiment of FIG. 4E, (j) is 3, i.e. parity sector 300 is written to the third storage medium 430. Applicants' method further maintains a Parity State Identifier in the (i)th State Address portion, i.e. State Address 320 portion, of sector 300 on the third storage medium. In the illustrated embodiment of FIG. 4E, that Parity State Identifier is "00." Thus in the illustrated embodiment of FIG. 4E, the Data State Identifier and the Parity State Identifier are the same for the information written to sector 300 on storage medium 410.

Figure 4F:
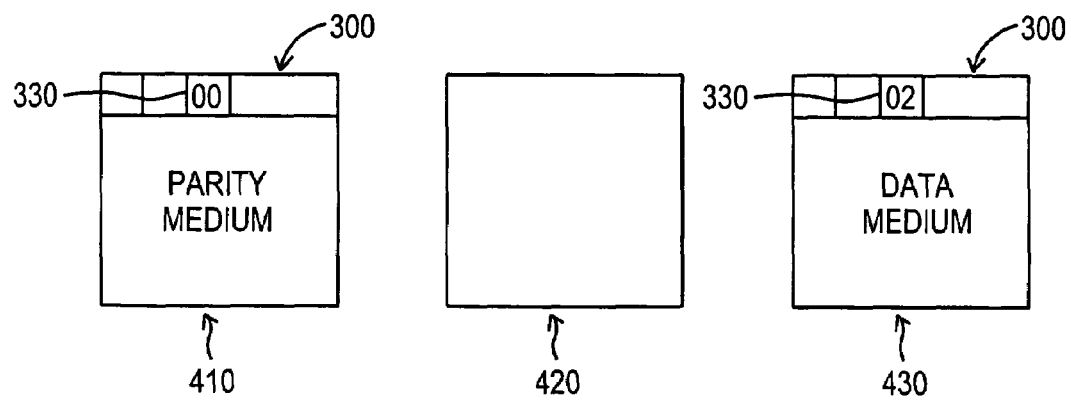
FIG. 4F is a block diagram showing a Data State Identifier maintained at a third State Address on the (m)th sector written to a third storage medium and a corresponding Parity State Identifier maintained at a third State Address on the (m)th sector written to a first storage medium.

In the illustrated embodiment of FIG. 4F, information has been written to sector 300, i.e. the "m(th)" sector, on the (i)th storage medium 430, where (i) is 3. This being the case, Applicants' method maintains a Data State Identifier at the (i)th State Address portion 330 of that (m)th sector of the (i)th storage medium. In the illustrated embodiment of FIG. 4F, that Data State Identifier is "02." Applicants' method maintains a corresponding (m)th parity sector on the (j)th storage medium. In the illustrated embodiment of FIG. 4F, (j) is 1 i.e. parity sector 300 is written to the first storage medium 410. Applicants' method further maintains a Parity State Identifier in the (i)th State Address portion, i.e. State Address 330 portion of sector 300 on the first storage medium. In the illustrated embodiment of FIG. 4F, that Parity State Identifier is "00." Thus in the illustrated embodiment of FIG. 4F, the Data State Identifier and the Parity State Identifier differ indicating that a dropped write has occurred.

Referring again to FIG. 2, in certain embodiments Applicants' method defines 4 different parity states, namely State0, State1, State2, and State3. In the illustrated embodiment of FIG. 2, State0 is assigned identifier "00," State1 is assigned identifier "01", State2 is assigned identifier "10," and State3 is assigned identifier "11"

Using Applicants' method, each time data is written to sector 300, the Data State Identifier and the Parity State Identifier for sector 300 are incremented. As a general matter, Applicants' method includes defining (N) states. Incrementing the (i)th Data State/Parity State for sector 300 includes assigning to sector 300 the (i+1)th Data State and the (i+1)th Parity State, unless (i) equals (N−1). If (i) equals (N−1), then incrementing the (i)th Data State/Parity State means setting (i) equal to 0. For example where (N) is 4, State0 is incremented to State1, State1 is incremented to State2, State2 is incremented to State3, and State3 is incremented to State0.

Figure 5:
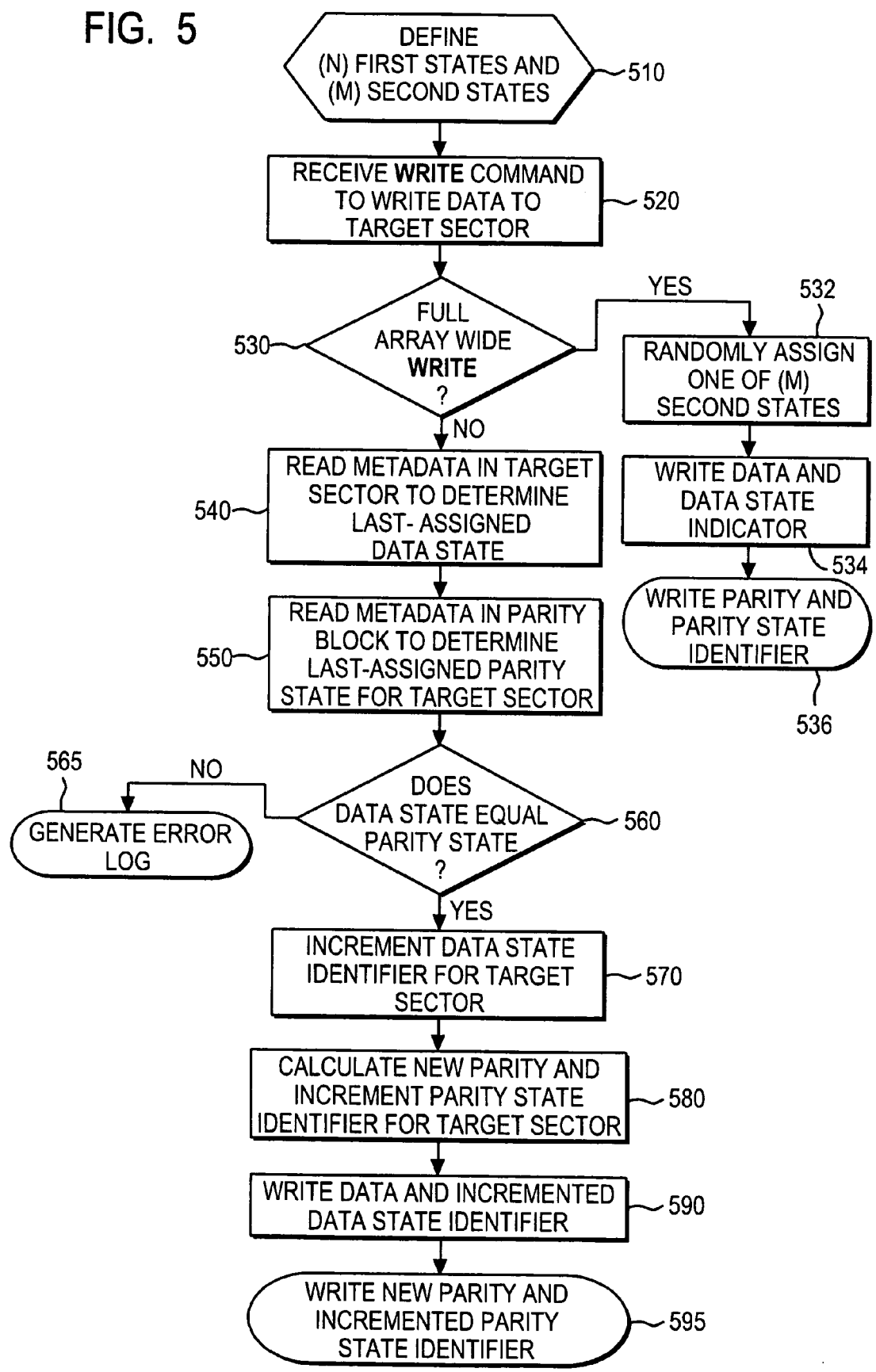
FIG. 5 is a flow chart summarizing the steps of Applicants' method to write data.

Applicants' invention includes a method to check data integrity when handling data. The steps of an embodiment of that method to write data are summarized in FIG. 5. Referring now to FIG. 5, in step 510 Applicants' method defines (N) First Data and Parity States and (M) Second Data and Parity States. The (N) First States are used when performing less than a full array wide WRITE. The (M) Second States are used when performing a full array wide WRITE.

In certain embodiments, step 510 includes defining 4 First States. In certain embodiments, those 4 First States correspond to States 210 (FIG. 2), 230 (FIG. 2), 250 (FIG. 2), and 270 (FIG. 2), where those 4 First States are assigned identifiers 220, 240, 260, and 280, respectively. In other embodiments, Applicants' method defines more than 4 States. In yet other embodiments, Applicants' method defines 2 States. In yet other embodiments, Applicants' method defines 3 States.

In certain embodiments, the (N) First States of step 510 are defined by the manufacturer of the information storage and retrieval system, such as for example system 100 (FIG. 1). In other embodiments, the (N) First States of step 510 are defined by the owner and/or operator of the information storage and retrieval system. In yet other embodiments, the (N) First States of step 510 are defined by a host computer, such as for example host computer 125 (FIG. 1).

In step 520, Applicants' information storage and retrieval system receives data and a WRITE command to write that data to a target sector, i.e. a designated Logical Block Address. In certain embodiments, step 520 is performed by a processor disposed in Applicants' information storage and retrieval system, such as for example processor 132 (FIG. 1).

In step 530, Applicants' method determines if the WRITE command of step 520 includes a full array wide WRITE, i.e. a full parity stripe. In certain embodiments, step 530 is performed by a processor disposed in Applicants' information storage and retrieval system, such as for example processor 132 (FIG. 1). If Applicants' method determines in step 530 that the WRITE command of step 520 comprises a full array wide WRITE, then the method transitions from step 530 to step 532 wherein the method randomly assigns one of the (M) Second States as both the Data State Identifier and the Parity State Identifier. In certain embodiments, step 532 is performed by a processor disposed in Applicants' information storage and retrieval system, such as for example processor 132 (FIG. 1).

Applicants' method transitions from step 532 to step 534 wherein the method writes the data received in step 520, and writes the Data State Identifier assigned in step 532 to the designated information storage array. In certain embodiments, step 534 is performed by a processor disposed in Applicants' information storage and retrieval system, such as for example processor 132 (FIG. 1).

In step 536, Applicants' method writes the Parity State Identifier assigned in step 532 to the corresponding parity block disposed in Applicants' information storage array. In certain embodiments, step 536 is performed by a processor disposed in Applicants' information storage and retrieval system, such as for example processor 132 (FIG. 1).

If Applicants' method determines in step 530 that the WRITE command of step 520 does not comprises a full array wide WRITE, then the method transitions from step 530 to step 540 wherein the method reads the last assigned Data State Identifier for each target sector. References herein to writing "a target sector" or "the target sector" include writes to more than one target sector where that write operation comprises less than a full stride write. In certain embodiments, step 540 is performed by a processor disposed in Applicants' information storage and retrieval system, such as for example processor 132 (FIG. 1).

Applicant's method transitions from step 540 to step 550 wherein the method reads the last assigned Parity State Identifier for each target sector. In certain embodiments, step 550 is performed by a processor disposed in Applicants' information storage and retrieval system, such as for example processor 132 (FIG. 1).

Applicants' method transitions from step 550 to step 560 wherein the method compares the Data State Identifier read in step 540 for each target sector with the Parity State Identifier read in step 550 for each target sector. In certain embodiments, step 560 is performed by a processor disposed in Applicants' information storage and retrieval system, such as for example processor 132 (FIG. 1).

If Applicants' method determines in step 560 that the Data State Identifier and the Parity State Identifier differ for any of the target sectors, then a dropped write has been detected. For example, in the illustrated embodiment of FIG. 4F the Data State Identifier and the Parity State Identifier differ. If the Data State Identifier and the Parity State Identifier differ, then Applicants' method transitions from step 560 to step 565 wherein the method generates an error log. In certain embodiments, step 565 is performed by a processor disposed in Applicants' information storage and retrieval system, such as for example processor 132 (FIG. 1).

Alternatively, if Applicants' method determines in step 560 that the Data State Identifier and the Parity State Identifier for each target sector are the same, then Applicants' method transitions from step 560 to step 570. For example, in the illustrated embodiment of FIG. 4D the Data State Identifier and the Parity State Identifier are the same.

In step 570, Applicants' method increments the Data State Identifier for each target sector, and saves that incremented Data State Identifier(s). In certain embodiments, step 570 is performed by a processor disposed in Applicants' information storage and retrieval system, such as for example processor 132 (FIG. 1).

In step 580, Applicants' method calculates a new parity for each target sector, and increments the Parity State Identifier for each target sector. In certain embodiments, step 580 is performed by a processor disposed in Applicants' information storage and retrieval system, such as for example processor 132 (FIG. 1).

In step 590, Applicants' method writes the data received in step 520 to the data portion of the target sector(s), and writes the incremented Data State Identifier for each target sector to the metadata portion(s) of the target sector(s). In certain embodiments, step 590 is performed by a processor disposed in Applicants' information storage and retrieval system, such as for example processor 132 (FIG. 1).

In step 595, Applicants' method writes the new parity for each target sector and the incremented Parity State Identifier for each target sector to the parity block for each target sector. In certain embodiments, step 595 is performed by a processor disposed in Applicants' information storage and retrieval system, such as for example processor 132 (FIG. 1).

Referring now to FIGS. 5 and 6, in certain embodiments Applicants' method is encoded using algorithm 600. Step 610 comprises elements of step 540. Step 620 comprises elements of step 550. Step 630 comprises elements of step 560. Steps 640 and 650 comprise elements of step 570. Step 660 comprises elements of step 580. Step 670 comprises elements of step 590. Step 680 comprises elements of step 595.

Applicants' method further includes embodiments to read data. Referring now to FIG. 7, in step 710 Applicants' information storage and retrieval system receives a READ command to read data from a target sector, i.e. a designated Logical Block Address. References herein to reading "a target sector" or "the target sector" include reads of more than one target sector. In certain embodiments, step 710 is performed by a processor disposed in Applicants' information storage and retrieval system, such as for example processor 132 (FIG. 1).

In step 720, Applicants' method reads the last assigned Data State Identifier for each target sector. In certain embodiments, step 720 is performed by a processor disposed in Applicants' information storage and retrieval system, such as for example processor 132 (FIG. 1).

Applicant's method transitions from step 720 to step 730 wherein the method reads the last assigned Parity State Identifier for each target sector. In certain embodiments, step 730 is performed by a processor disposed in Applicants' information storage and retrieval system, such as for example processor 132 (FIG. 1).

Applicants' method transitions from step 730 to step 740 wherein the method compares the Data State Identifier for each target sector with the Parity State Identifier for each target sector. In certain embodiments, step 740 is performed by a processor disposed in Applicants' information storage and retrieval system, such as for example processor 132 (FIG. 1).

If Applicants' method determines in step 740 that the Data State Identifier and the Parity State Identifier for any target sector differs, then a dropped write has been detected. If the Data State Identifier and the Parity State Identifier for any target sector differs, then Applicants' method transitions from step 740 to step 750 wherein the method generates an error log. In certain embodiments, step 740 is performed by a processor disposed in Applicants' information storage and retrieval system, such as for example processor 132 (FIG. 1).

Alternatively, if Applicants' method determines in step 740 that the Data State Identifier and the Parity State Identifier are the same for all target sectors, then Applicants' method transitions from step 740 to step 760 wherein the method provides the requested information. In certain embodiments, step 760 is performed by a processor disposed in Applicants' information storage and retrieval system, such as for example processor 132 (FIG. 1).

The method of FIG. 5, or the method of FIG. 6, or the method of FIG. 7, may be implemented separately. In certain embodiments, individual steps recited in FIG. 5 and/or FIG. 6, and/or FIG. 7, may be combined, eliminated, or reordered.

In certain embodiments, Applicants' invention includes instructions residing in memory 133 (FIG. 1), where those instructions are executed by processor 132 (FIG. 1) to performs steps 520, 530, 532, 534, 536, 540, 550, 560, 565, 570, 580, 590, and 595, recited in FIG. 5, or steps 610 through 680 recited in FIG. 6, and/or steps 710 through 760 recited in FIG. 7. In other embodiments, Applicants' invention includes instructions residing in any other computer program product, where those instructions are executed by a computer external to, or internal to, system 100, to perform steps 520, 530, 532, 534, 536, 540, 550, 560, 565, 570, 580, 590, and 595, recited in FIG. 5, or steps 610 through 680 recited in FIG. 6, and/or steps 710 through 760 recited in FIG. 7. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to check data integrity when handling data, comprising the steps of:

providing an information storage array which includes an information storage array comprising a plurality of sectors;

defining (N) data state identifiers and (N) parity state identifiers wherein N is greater than or than or equal 1;

receiving a command to handle data, wherein said command designates a target sector, and wherein said target sector comprises one of said plurality of sectors;

determining the data state identifier assigned to said target sector, wherein said data state identifier comprises one of said (N) data state identifiers;

determining the parity state identifier assigned to said target sector, wherein said parity state identifier comprises one of said (N) parity state identifiers;

comparing said data state identifier and said parity state identifier;

when said data state identifier and said parity state identifier are the same, performing said command;

when said data state identifier and said parity state identifier differ, generating an error message.

2. The method of claim 1, wherein said receiving a command to handle data step further comprises receiving a WRITE command, further comprising:

receiving data;

when said data state identifier and said parity state identifier are the same:

incrementing said data state identifier for said target sector, wherein said incremented data state identifier comprises one of said (N) data states;

calculating a new parity for said target sector;

writing said data and said incremented data state identifier to said target sector;

incrementing said parity state identifier, wherein said incremented parity state identifier comprises one of said (N) parity states;

writing said new parity and said incremented parity state identifier to said information storage array.

3. The method of claim 2, further comprising the steps of:

providing a target sector comprising a data portion and a metadata portion;

writing said data to said data portion; and writing said incremented data state identifier to said metadata portion.

4. The method of claim 3, further comprising the step of providing a data state identifier comprising a set of two checkbits.

5. The method of claim 3, further comprising the step of providing a data state identifier comprising a set of more than two checkbits.

6. The method of claim 3, wherein said information storage array comprises (R) storage media, further comprising the steps of:

disposing (R) data state addresses in said metadata portion;

writing said incremented data state identifier to one of said (R) data state addresses.

7. The method of claim 2, further comprising:

providing an information storage array which includes (R) storage media, wherein (R) is equal to or greater than 2;

providing an information storage array comprising a plurality of parity blocks, wherein one or more of said plurality of parity blocks are written to each of said (R) storage media;

wherein said writing new parity and incremented parity state identifier step further comprises writing said new parity and said incremented parity state identifier to one or more of said plurality of parity blocks.

8. The method of claim 7, wherein said information storage array comprises (R) information storage media, further comprising the step of writing said data and said incremented data state identifier to (R-1) of said (R) information storage media.

9. The method of claim 8, further comprising the step of writing said new parity and said incremented parity state identifier step to said remaining information storage medium.

10. The method of claim 1, wherein said receiving a command to handle data step further comprises receiving a READ command designating a target sector, further comprising the step of providing information read from said target sector if said data state identifier and said parity state identifier are the same.

* * * * *